US012798250B2

(12) United States Patent
Funabashi

(10) Patent No.: US 12,798,250 B2
(45) Date of Patent: Nov. 17, 2026

(54) LIQUID EJECTION APPARATUS

(71) Applicant: CANON KABUSHIKI KAISHA, Tokyo (JP)

(72) Inventor: Tsubasa Funabashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/919,918

(22) Filed: Oct. 18, 2024

(65) Prior Publication Data

US 2025/0135785 A1 May 1, 2025

(30) Foreign Application Priority Data

Oct. 27, 2023 (JP) ................................ 2023-184713

(51) Int. Cl.

| | |
|---|---|
| ***B41J 2/165*** | (2006.01) |
| ***B41J 2/14*** | (2006.01) |
| ***B41J 29/17*** | (2006.01) |
| ***G01N 25/02*** | (2006.01) |

(52) U.S. Cl.

CPC ....... *B41J 2/16579* (2013.01); *B41J 2/14153* (2013.01); *B41J 2/16535* (2013.01); *B41J 29/17* (2013.01); *G01N 25/02* (2013.01)

(58) Field of Classification Search

CPC ........................ B41J 2/16579; B41J 2/14153; B41J 2/16535; B41J 29/17; B41J 2002/14354; B41J 2/0458; B41J 2/01; B41J 2/14032; B41J 29/38; G01N 25/02

See application file for complete search history.

(56) References Cited

U.S. PATENT DOCUMENTS

| | | | | |
|---|---|---|---|---|
| 10,308,021 | B2 | 6/2019 | Nomura | |
| 11,192,357 | B2 | 12/2021 | Oikawa | |
| 11,820,136 | B2 | 11/2023 | Oikawa | |
| 2016/0001561 | A1* | 1/2016 | Misumi | B41J 2/14072 347/26 |
| 2018/0170051 | A1 | 6/2018 | Nomura | |
| 2020/0108597 | A1 | 4/2020 | Oikawa | |
| 2022/0153017 | A1 | 5/2022 | Oikawa | |
| 2023/0054702 | A1 | 2/2023 | Kato | |

FOREIGN PATENT DOCUMENTS

| | | |
|---|---|---|
| JP | 2018-094878 A | 6/2018 |
| JP | 2019-142112 A | 8/2019 |
| JP | 2020-059163 A | 4/2020 |
| JP | 2023-030446 A | 3/2023 |

* cited by examiner

*Primary Examiner* — Lisa Solomon
(74) *Attorney, Agent, or Firm* — Venable LLP

(57) ABSTRACT

Provided is a liquid ejection apparatus, including: a head; a plurality of removal units for removing foreign substances; and a control unit. The head is constituted of a circuit substrate and a passage forming member which are joined, a chamber is disposed in the joined portion, a liquid supply port is disposed on the circuit substrate, nozzles to eject the liquid inside the chamber are disposed in the passage forming member, and a plurality of driving elements and a plurality of temperature sensors are disposed on the circuit substrate. The control unit selects the removal unit by analyzing a waveform of a signal from the temperature sensor, a protective film is disposed between the driving element and the chamber, and the removal unit removes the burnt deposit, which is a foreign substance, by applying voltage to the protective film and eluting the protective film thereby.

16 Claims, 10 Drawing Sheets

| | | EJECTION VELOCITY/EJECTION AMOUNT ACCURACY | | | |
|---|---|---|---|---|---|
| | | S | A | B | N.D. |
| EJECTION ANGLE | small | 0 | 1 | 2 | 9 |
| | medium | 3 | 4 | 5 | |
| | large | 6 | 7 | 8 | |

FIG. 8A

| | 0 | 1 | 2 | 3 | 4 | 5 | 6 | 7 | 8 | ··· | 493 | 494 | 495 | 496 | 497 | 498 | 499 | 500 |
|---|---|---|---|---|---|---|---|---|---|---|---|---|---|---|---|---|---|---|
| row1 | 0 | 3 | 1 | 4 | 0 | 9 | 2 | 2 | 5 | ··· | 4 | 0 | 6 | 4 | 5 | 0 | 2 | 4 |
| row2 | 0 | 7 | 1 | 0 | 2 | 2 | 3 | 0 | 0 | ··· | 0 | 3 | 0 | 0 | 4 | 5 | 2 | 0 |

FIG. 8B

LIQUID EJECTION APPARATUS

BACKGROUND OF THE INVENTION

Field of the Invention

The present invention relates to a liquid ejection apparatus.

Description of the Related Art

A liquid ejection apparatus which ejects liquid through nozzles is known. The liquid ejection apparatus is applicable to an inkjet recording type liquid ejection apparatus (recording apparatus) which ejects ink (liquid) and allows the ink to adhere to a recording medium, such as paper. An example of the liquid ejection apparatus is a thermal type inkjet apparatus, which ejects ink through nozzles using thermal energy generated by a heater. For such a liquid ejection apparatus, higher image quality and faster speed are constantly demanded.

Generally, the thermal type inkjet recording apparatus generates bubbles in the nozzles by locally heating such liquid as ink using micro-sized heaters, and ejects the ink through the nozzles by these bubbles, allowing the ink to adhere to a print target. In the case of this thermal type liquid ejection apparatus (recording head), heating resistor elements for heating ink are integrated on a semiconductor substrate, along with logic circuits to drive the heating resistor elements. Thereby the above mentioned demand for high image quality and faster speed is satisfied, and, at the same time, the heating resistor elements can be disposed at high density, and high-speed driving can be implemented.

Japanese Patent Application Publication No. 2018-094878 discloses the thermal type inkjet recording apparatus. This inkjet recording apparatus includes a plurality of temperature sensors corresponding to a plurality of heating resistor elements in a liquid ejection head. Here it is proposed that means for determining the ejection states of nozzles, based on the waveforms of the temperature sensors and outputting the result, is provided in the recording element substrate, so as to determine normal/failure of ejection.

SUMMARY OF THE INVENTION

In the case where an abnormality is detected in ejection of the ink, the failed nozzle can often be recovered to the normal state by performing such maintenance as cleaning the head. For example, if an insoluble substance, such as a burnt deposit, is stuck to a heater, the deposit on the heater is cleaned or removed. If the viscosity of the liquid near a nozzle increased due to drying, for example, the liquid is replaced with normal liquid by suction or circulating flow. Thus most of the causes of ejection failure are foreign substances inside a liquid chamber, including the surface of the heater, or in the periphery of the nozzle corresponding to the liquid chamber, and ejection can be normalized by appropriately removing the foreign substance. On the other hand, cleaning involves physical contact and chemical alteration, and the head may be damaged depending on the foreign substance removal method, and collective damage like this can shorten the life of the liquid ejection head.

In Japanese Patent Application Publication No. 2018-094878, however, only normal/failure of ejection is determined and the cause of the failure is not specified, hence optimum cleaning means may not be selected. Further, subtle changes of velocity and quantity of droplets in the range of normal ejection cannot be recognized, hence the head having a problem may be used until it actually fails, and at this point cleaning may cause more damage.

With the foregoing in view, it is an object of the present invention to provide a liquid ejection apparatus that can appropriately select cleaning means for the liquid ejection head.

The present invention provides a liquid ejection apparatus, comprising:

a liquid ejection head configured to eject liquid;

a plurality of removal units configured to remove foreign substances inside the liquid ejection head; and a control unit, wherein the liquid ejection head is formed by bonding a circuit substrate and a flow passage forming member, a liquid chamber in which liquid is filled is disposed in a portion where the circuit substrate and the flow passage forming member are joined, a liquid supply port to supply liquid to the liquid chamber is disposed on the circuit substrate, nozzles to eject the liquid inside the liquid chamber are disposed in the flow passage forming member, a plurality of driving elements configured to be heated by applying voltage and eject the liquid, and a plurality of temperature sensors are disposed on the circuit substrate, the control unit is configured to select the removal unit to remove the foreign substance from the plurality of removal units, based on a result of analyzing a waveform of a signal outputted from the temperature sensor, a protective film is disposed between the driving element and the liquid chamber on the circuit substrate, the foreign substance is a burnt deposit adhering to the protective film, and the removal unit is unit for removing the burnt deposit by applying voltage to the protective film and eluting the protective film thereby.

According to the present invention, a liquid ejection apparatus that can appropriately select cleaning means for the liquid ejection head can be provided.

Further features of the present invention will become apparent from the following description of exemplary embodiments with reference to the attached drawings.

BRIEF DESCRIPTION OF THE DRAWINGS

FIGS. 8A and 8B are examples of an output in which classification and classification number are linked to each nozzle;

DESCRIPTION OF THE EMBODIMENTS

Preferred embodiments of the present invention will now be described in detail with reference to the drawings. Dimensions, materials, shapes, relative positions, and the like of the components described in the embodiments, however, are not intended to limit the scope of the invention unless otherwise specified. Materials, shapes and the like of members described once below are the same for subsequent description unless otherwise specified. For configurations and steps not especially illustrated or described, known techniques or conventional techniques in this technical field may be used. Redundant description may be omitted.

1. Embodiment 1

1.1. Configuration of Element Substrate

Figure 1:
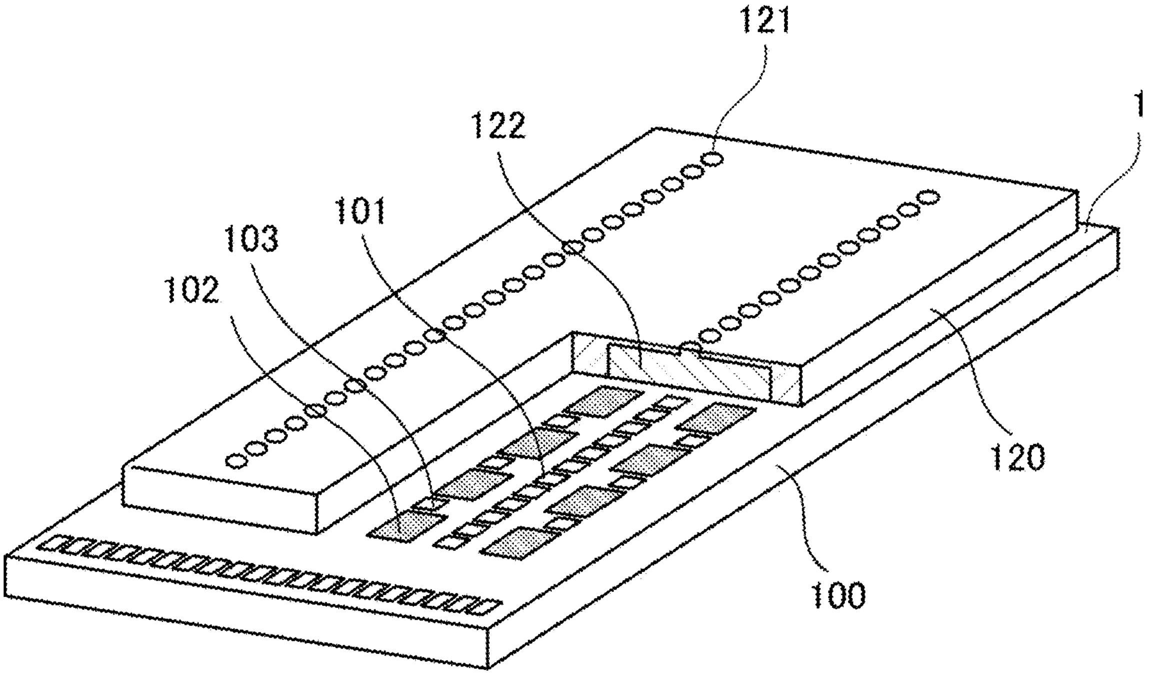
FIG. 1 is a conceptual perspective view of a recording element substrate for a liquid ejection head.

FIG. 1 is a partially cutaway conceptual perspective view depicting a recording element substrate for a liquid ejection head of Embodiment 1. A substrate for a liquid ejection head (recording element substrate) 1 of Embodiment 1 is formed of a flow passage forming member 120 bonded on a circuit substrate 100 to provide thermal energy to liquid. This flow passage forming member 120 is constituted of a plurality of nozzles 121 which eject liquid, disposed at positions facing driving elements 101, which are thermal action portions to heat the liquid. A liquid chamber 122 that communicates with the nozzles 121 is formed from liquid supply ports 102, which penetrate through the circuit substrate 100 via an area on the driving elements 101. The circuit substrate 100 also includes counter electrodes 103, which are needed to apply voltage to electrochemically elute a protective film.

Figure 2:
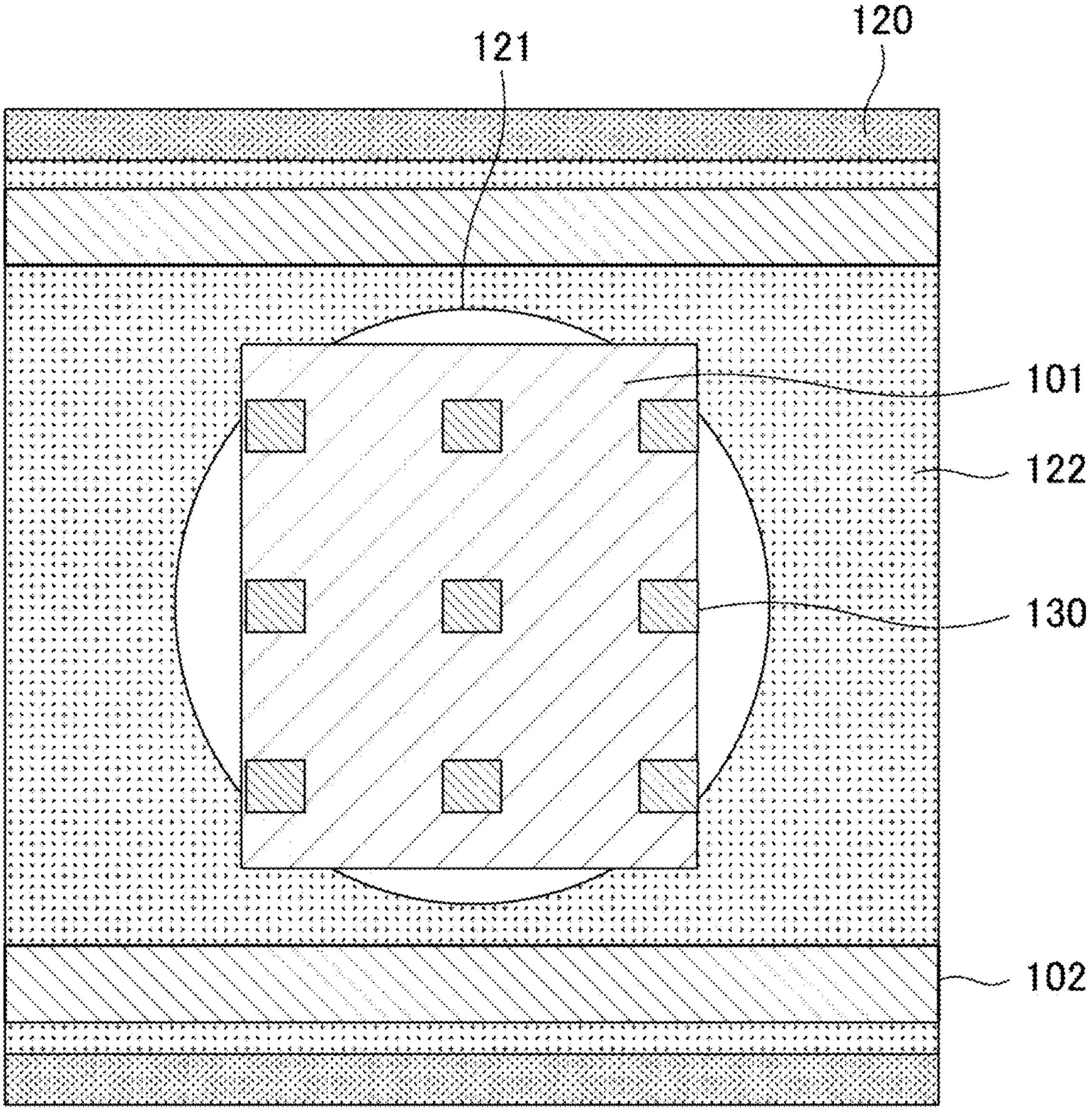
FIG. 2 is a plan view depicting a sensor arrangement according to Embodiment 1.

FIG. 2 is a schematic plan view depicting the arrangement of a driving element 101 and sensors 130 corresponding to the nozzle 121. FIG. 2 is a pan view viewed from the top surface of the substrate, and is a perspective view such that a pattern of a lower layer can be seen through each member. The protective film is formed on the entire surface, so it is omitted in FIG. 2. On the circuit substrate 100, one or a plurality of driving elements 101, which generate heat by flowing electric current, are disposed. As illustrated in FIG. 1, the liquid chamber 122 is disposed at a portion where the circuit substrate 100 and the flow passage forming member 120 are bonded, and ink is filled into the liquid chamber 122 from the liquid supply port 102, which is a part of the flow passage of the liquid.

Heat is generated by supplying electric current from a power supply portion to the driving element 101, and liquid, which received the thermal energy generated by this heating, is foamed, whereby the liquid is ejected. In FIG. 2, a driving element 101, which is rectangular in the plan view, is used, but the shape of the driving element 101 is not limited to this.

On an underlayer of the driving element 101, the sensors 130, to detect temperature change by the change of a resistance value or capacitance value, are disposed. In FIG. 2, nine sensors 130 are disposed in a region corresponding to one driving element 101, but the positions and number of sensors 130 are not limited to this. The shape of the driving element 101 is not limited to a rectangle, and is preferably designed to be suitable for a temperature change to be detected. For the positions of the sensors 130, it is preferable to dispose at least a part of the sensors 130 at positions overlapping with the liquid chamber 122 in the plan view, so as to detect the sizes of foaming and defoaming positions. However the present invention is not limited to this, and depending on the design, the sensors 130 may be disposed at positions not overlapping with the liquid chamber 122, since a change in environment information, such as temperature, can still be detected. To detect a sudden temperature change, it is preferable to dispose the sensors 130 at positions close to the liquid. For example, the temperature change can be sensitively detected if the sensors 130 are disposed on the driving element 101, or on the surface or inside the flow passage forming member 120. The sensors 130 may be disposed on the same layer as the driving element 101. However the sensors 130 may be disposed under the driving element 101 if a desired detection performance can be obtained.

It is preferable that the center of the nozzle 121 matches with or is close to the center of the driving element 101 in the plan view. However if the liquid can be ejected by foaming, the center positions thereof need not match. Further, the shape of the nozzle is not limited to a circle.

Figure 3:
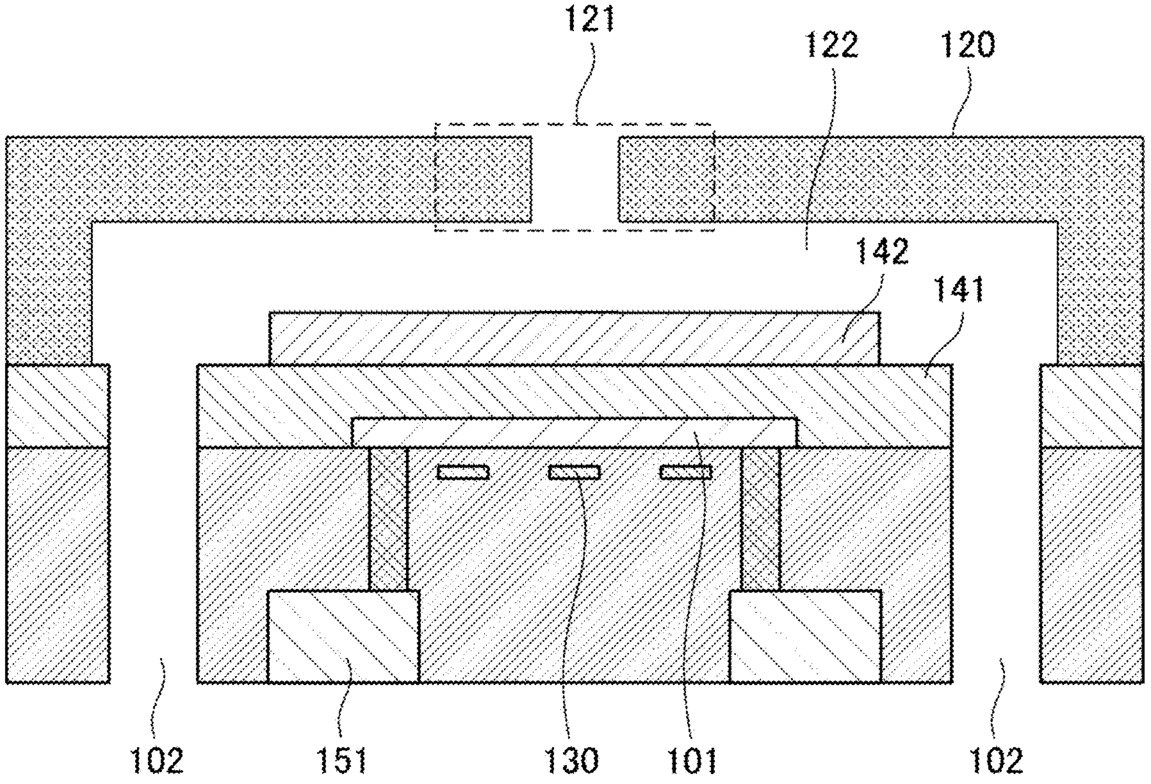
FIG. 3 is a cross-sectional view depicting a sensor structure according to Embodiment 1.

FIG. 3 is a schematic cross-sectional view depicting positions of the driving element 101 and the sensors 130 corresponding to the nozzle 121. As illustrated here, the liquid chamber 122, formed at the junction of the flow passage forming member 120 and the circuit substrate 100, receives liquid supplied from the liquid supply ports 102, and communicates with the nozzle 121, so as to supply liquid to the nozzle 121 when the liquid is ejected. The driving element 101 is covered by a lower protective film 141 and an upper protective film 142. Each of these protective films plays a respective role, specifically, the lower protective film insulates the driving element 101, and the upper protective film protects the driving element 101 from physical/chemical erosion caused by the liquid or the like. As long as the driving element 101 is sufficiently protected, a number of layers of the protective film is not limited to 2.

The upper protective film 142 contacts with the liquid in the liquid chamber 122. When power is supplied from a connected wiring 151 to the driving element 101 and heat is generated thereby, the temperature momentarily rises to several hundred ° C. and then drops within several milliseconds. In some cases, the liquid foamed by boiling may generate micro-vacuum bubbles called "cavitation" at defoaming, which applies large impact pressure on the protective film when the bubbles breakdown. In order to appropriately protect the driving element 101 from this harsh environment, it is preferable that at least a part of the protective film contains physically/chemically stable materials, and a film containing a platinum group element, such as palladium, iridium and platinum, is ideal. In Embodiment 1, the upper protective film 142 is an iridium film of 100 nm film thickness, and the lower protective film 141 is a silicon nitride film of 100 nm film thickness.

The sensors 130 are disposed under the driving element 101. It is preferable that the temperature sensors are disposed near the liquid chamber 122 and the liquid supply ports 102, so that the temperature change caused by the movement of the liquid can be detected. In Embodiment 1, the sensors 130 are disposed under the driving element 101, but may be disposed above the driving element 101, or on the surface or inside the flow passage forming member 120. Further, the same layer as the driving element 101 or the driving element 101 itself may be used as the temperature sensor. The temperature characteristics of each sensor is expressed by a temperature coefficient of resistance (TCR), and it is preferable that the change amount of the resistance value, with respect to a unit temperature change amount, is large. Specifically, the sensors are preferably formed of a material containing at least one element out of platinum, iridium, tungsten, zirconium, copper, nickel, zinc, titanium, silicon, aluminum, and the like. In this example, an alloy film containing titanium is used.

1.2. Examples of Foreign Substances and Removal Methods

A "foreign substance" in the present description refers to a substance in general which is at a position where the liquid contacts and interferes with normal foaming. A typical foreign substance is a solid burnt deposit which contacts with the film protecting the driving element 101. Other foreign substances are an adhering substance and a high viscosity liquid originating from the liquid remaining at or adhering to the nozzle 121, or at a position close to the nozzle 121 on the atmosphere side surface of the flow passage forming member 120 (surface on the opposite side of the liquid chamber side). Dirt, bubbles and the like that are stuck in the liquid supply port 102 are also foreign substances. These foreign substances may affect the flow passage resistance during foaming and the hydrophilic/water repellent balance of the flow passage forming member 120, or may cause uneven foaming, which results in the deterioration of velocity, amount, ejection angle and the like of droplets.

The foreign substances described in Embodiment 1 are removed by the following method. For example, the foreign substances on the surface of the flow passage forming member 120 on the atmosphere side (e.g. adhering substance and high viscosity liquid originating from the liquid) can be wiped out by a wiper formed of highly flexible material. Further, foreign substances around the nozzles and inside the nozzles can be removed by sucking the liquid from the nozzles 121 by such suction means as a suction tube using air pressure. The wiping and suction may be performed simultaneously. However in many cases of discharging the foreign substances in the droplet ejecting direction, such as wiping and suction, another mechanical apparatus, separate from the liquid ejection head, need be provided. Therefore installing and removing the apparatus increases down time. Moreover, cost may increase, and the need for installation space of the apparatus may increase the size of the liquid ejection apparatus.

In other words, it is desirable to discharge the foreign substances in the flow passage direction, such as the liquid supply port 102. For example, the foreign substances around the nozzle 121 can be discharged in the flow passage direction by force feeding and circulating liquid using one of the liquid supply ports 102 as an inlet and the other as an outlet. Further, by foaming the liquid by the driving element 101, not only the foreign substances around the nozzle 121 but also solid foreign substances contacting the films protecting the driving element 101 can be pushed out using the foaming pressure or the defoaming pressure of the liquid. In this case, the driving element to push out the foreign substances need not be the same as the driving element 101 to eject droplets for printing, and the driving elements and the flow passage may be designed separately so that the force to push out foreign substances can be appropriately applied.

If the burnt deposits generated by the liquid exposed to high temperatures build up, it becomes relatively difficult to be removed by any of the above methods. In this case, the foreign substances on the upper protective film 142 may be removed by electrochemically eluting from the upper protective film 142, for example. Specifically, the upper protective film 142 is formed as a conductive film containing a platinum group element, such as palladium, iridium and platinum, and is used as an anode by applying voltage, whereby the film can be eluted. The film material is not limited to the platinum group element, as long as the film can be eluted by applying voltage. The potential to be applied is not limited to a positive potential either. The elution amount can be accurately controlled by managing the electric current amount. On the other hand, the film thickness that can be eluted is limited with respect to the film thickness of the fabricated protective film, therefore the downside of this method is that the life of the liquid ejection head may be shorted by this deposits removal operation.

Figure 4:
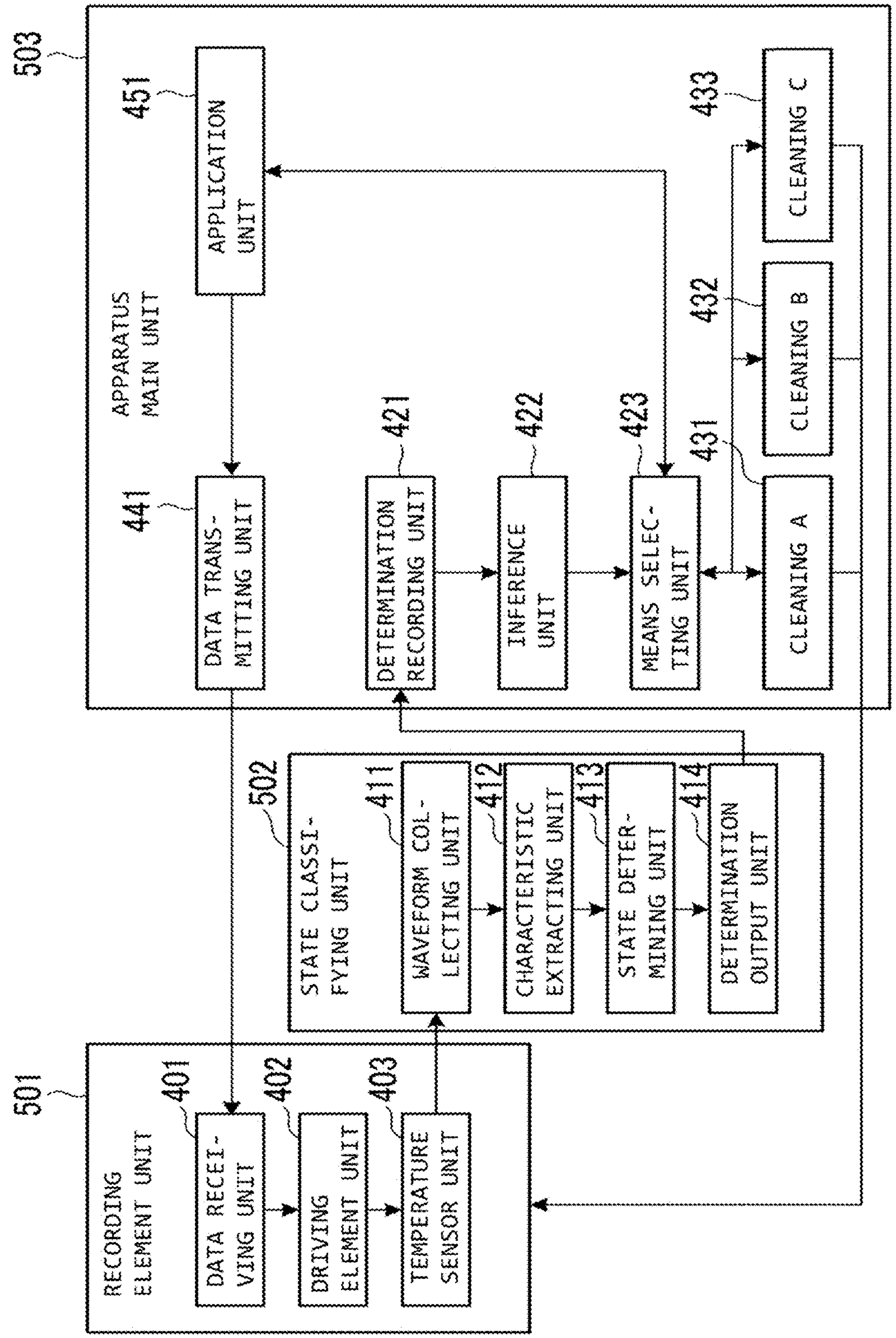
FIG. 4 is a block diagram according to Embodiment 1.

FIG. 4 is a block diagram depicting an example of a hardware/software configuration when a waveform acquired from the sensor 130 is fed back to the head cleaning means. Here blocks related to the sensor waveform processing are indicated, and some of the hardware/software are omitted. For example, an interface to input the print data to the liquid ejection apparatus is omitted. Each function indicated in the software configuration is implemented by an information processing apparatus (e.g. computer, control circuit), which includes arithmetic resources (e.g. processor, memory), operating in response to a program instruction or input by the user. FIG. 4 indicates: a recording element unit 501 which is installed in the liquid ejection head and includes the above mentioned circuit substrate and the like; a state classifying unit 502 which determines classification of foreign substances and the like; and an apparatus main unit 503 which is a main unit of the liquid ejection apparatus (recording apparatus). This, however, does not always indicate a physical classification. For example, the functions of the state classifying unit 502 may be executed by an information processing apparatus which is included in the main unit of the liquid ejection apparatus. Further, various information processing may be executed by an external information processing apparatus which can communicate with the liquid ejection apparatus. In the present invention, these blocks perform acquisition and analysis of waveforms outputted from the sensor 130, determination of foreign substances, selection of removing means (removing unit), and the like, and these blocks as a whole may be regarded as a control unit.

Normally in accordance with the instruction by an application unit 451, an image to be printed, driving conditions of the driving element, and other information are transmitted from a data transmitting unit 441 to a data receiving unit 401 of the recording element unit 501 installed in the liquid ejection head. Based on this information, a driving element unit 402 of the recording element unit 501 selects an ejection nozzle and inputs the driving conditions. Further, at the same time, with the driving of the driving element, a temperature sensor unit 403 of the recording element unit 501 acquires a temperature waveform by the sensor 130. The temperature sensor unit 403 may be regarded as the sensor 130 itself, or may be regarded as a collection of the sensor 130 and the control blocks for processing the output of the sensor 130. The sensor waveform is acquired during printing or between printing steps, independent from printing, hence the information transmitted from the data transmitting unit 441 may be dedicated data for acquiring the sensor waveform. The temperature waveform acquired by the temperature sensor unit 403 is transmitted to a waveform collecting unit 411 of the state classifying unit 502.

The waveform information received by the waveform collecting unit 411 of the state classifying unit 502 is used for extracting the waveform characteristics in a characteristic extracting unit 412, and determining and classifying the state in a state determining unit 413. Normally there are a plurality of nozzles 121 for ejecting liquid, and in some cases, a plurality of temperature sensors which correspond to the nozzles respectively. Therefore in order to improve print speed, the plurality of waveforms must be processed at high-speed. This means that it is preferable that at least a part of the circuits constituting the state classifying unit are configured to process a large amount of sensor waveforms at high-speed. It is more preferable that the circuits are disposed in the liquid ejection head. Further, it is even more preferable that the circuits are configured on the same element substrate as the recording element unit installed in the liquid ejection head. In the same manner, it is preferable that the information outputted from the state classifying unit 502 is digital signals that can be outputted at high-speed. However, depending on the data volume and frequency of the sensor waveforms to be acquired, the state classifying unit 502 may be integrated in the apparatus main unit, and the installation location thereof is not limited to the above description. The information on the result of the classification and determination is outputted from a determination output unit 414, and is transmitted to a determination recording unit 421 of the apparatus main unit 503.

In the determination recording unit 421, all the determination records of the liquid ejection head used for the apparatus are stored. In order to hold information from the past even if the recording head is replaced, the determination recording unit 421 is preferably included in the liquid ejection apparatus main unit. An inference unit 422 determines an optimum processing flow using the determination record of each nozzle of the liquid ejection head, information on other liquid ejection apparatuses, and the latest inference model based on this information as the determination materials. Then the selection of the cleaning method and necessity of the selection are fed back from a means selecting unit 423 to an application unit 451, and the cleaning is executed. In this example, there are 3 types of cleaning means, A, B and C, (reference numbers 431 to 433), but this is not intended to limit a number of cleaning means of the present invention. Even if the same cleaning method is selected, the target range and intensity can be changed. The inference unit 422 also infers the optimum cleaning conditions. Thereby an effective cleaning can be executed with minimal downtime.

Figure 5:
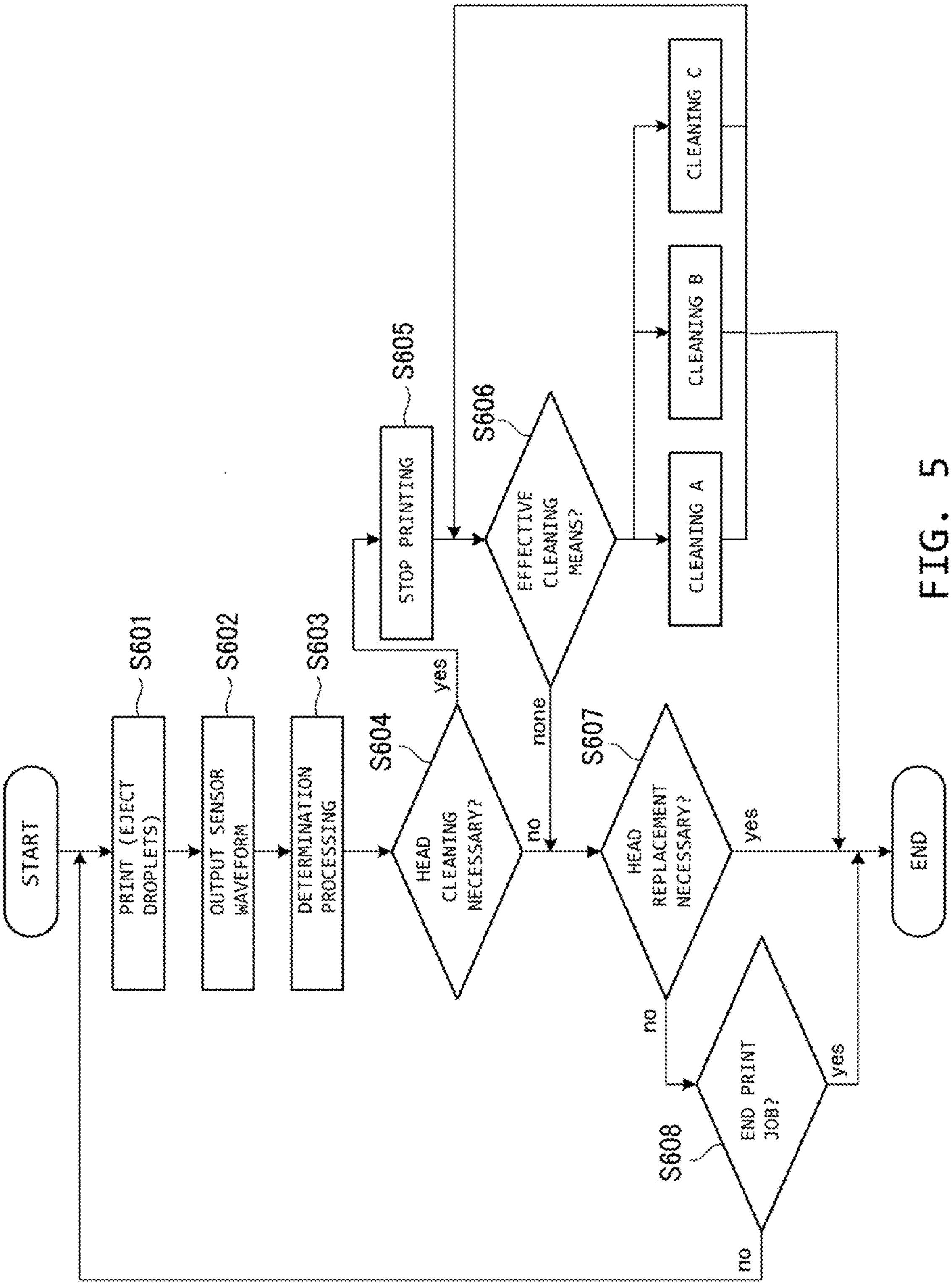
FIG. 5 is a flow chart according to Embodiment 1.

FIG. 5 is a flow chart depicting an example of a sensor waveform processing procedure of the liquid ejection apparatus during printing. In step S601, voltage is applied to the driving element 101 at a predetermined position based on image information, and droplets of ink are ejected, whereby the image is recorded on a recording medium. The sensor 130, which detected the temperature change caused by this image recording (printing), outputs a sensor waveform in step S602. The output of the sensor waveform and determination processing are not always performed. Considering the information processing cost, it is preferable to perform this processing at a timing when the cleaning to remove foreign substances can be effectively performed. The flow in FIG. 5 is the case of outputting the sensor waveform, and a case of not outputting the sensor waveform is omitted. The determination processing in step S603 is performed based on the output waveform, and depending on this determination result, the necessity of cleaning the liquid ejection head is determined. Appropriate timings of outputting the sensor waveform are typically at the startup of the apparatus, at every predetermined number of images that are recorded, at every predetermined time, at performing maintenance of the apparatus, and the like. However, the sensor waveform may always be outputted each time an image is recorded.

When it is determined that cleaning is necessary in step S604, in many cases printing is stopped in step S605. However, some cleaning can be executed during printing depending on the type of foreign substances and the specifics of the cleaning. In such cases, printing need not be stopped. For example, if minor dirt exists in the liquid chamber, foam is generated only for the nozzle 121 corresponding to the position of the dirt, and the dirt can be removed thereby while printing is being performed. Further, if ink lightly adheres around the nozzle 121, this adhering can be solved while printing is being performed by applying relatively strong pulses to the driving element 101, which plays a role of a thermal action unit.

As a result of analyzing how the foaming, ejection and defoaming deviate from normal using the sensor waveform, and estimating the position and state of the foreign substances causing this deviation, effective cleaning means is selected in step S606. For example, cleanings A to C can be selected, and if one of A to C is determined as effective, the selected cleaning processing is executed, and processing ends.

If it is determined that none of the provided cleaning means is effective ("none" in S606), then cleaning is not performed unnecessarily, but the necessity of the head replacement is determined in step S607. Selection of the cleaning means refers to selecting an effective one from a plurality of possible means, and a combination of a plurality of means may be selected, or same means may be performed a plurality of times. In the case where it is determined that cleaning is unnecessary in step S604 as well, processing advances to step S607, and the necessity of the head replacement is determined. A case where the head replacement is necessary is, for example, a case where there is a nozzle from which normal ejection characteristics (e.g. ejection velocity, ejection amount, ejection angle) cannot be obtained even after various cleanings are performed, and there are no nozzles having normal characteristics that can compensate for the failed nozzle. Processing to measure ejection characteristics may be performed after the cleaning processing in order to determine the necessity of the head replacement.

If the head replacement is necessary, the replacement sequence is started. Replacement may be performed automatically, or may be performed manually after necessity of the head replacement is notified to the user. If the head replacement is not necessary, it is determined whether the print job has ended in step S607. Printing is restarted if the print job has not ended.

In the configuration of this example, there are 3 types of cleaning means, A, B and C, but this is not intended to limit a number of cleaning means of the present invention. Output of a sensor waveform corresponding to a certain nozzle may be performed in parallel with ejection of droplets of another nozzle, and the determination processing in S603 may be determined in total based on the plurality of outputs of sensor waveforms. By the above processing, optimum and effective removal means for the foreign substances generated in the liquid ejection head can be selected based on feedback, and downtime and damage to the head can be minimized.

1.3. Analysis of Sensor Waveform

Figure 6A:
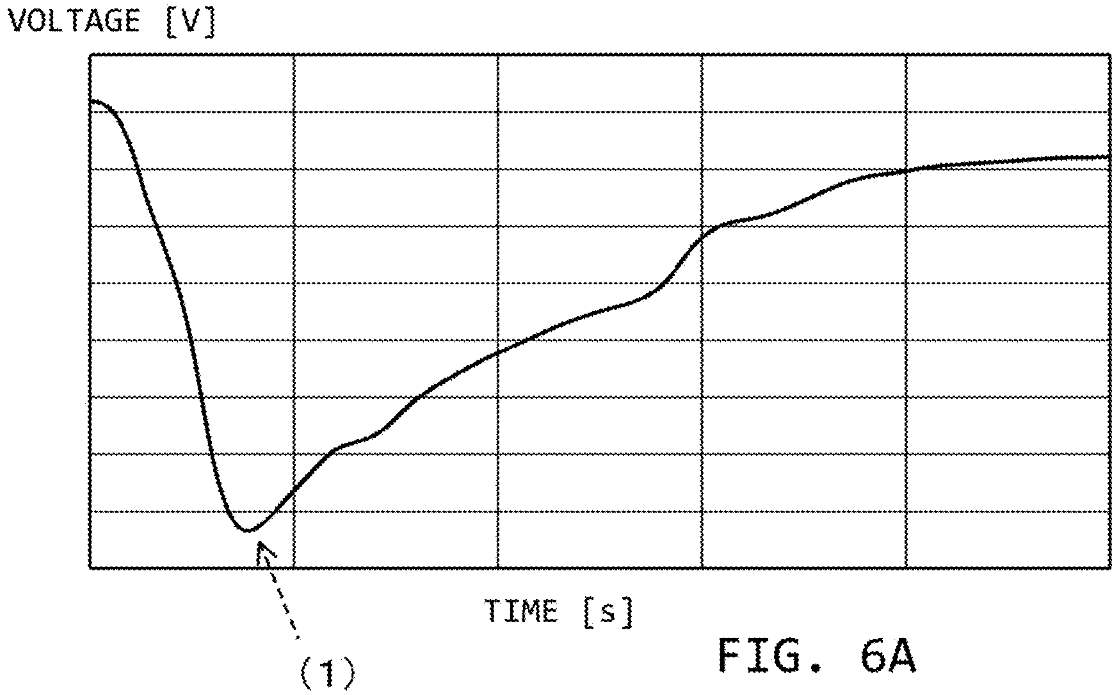
FIGS. 6A and 6B are graphs indicating waveforms based on temperature change according to Embodiment 1.

FIG. 6A is a part of an analog waveform of a signal (of voltage) acquired by a temperature sensor (the sensor 130). The abscissa indicates time [s], and the ordinate indicates sensor output voltage [V]. This waveform in FIG. 6A is outputted by supplying a constant current to the sensor 130, and reading the change in the voltage value when the temperature changes. In a case of an alloy film containing titanium, TCR has a negative value, therefore a resistance value drops if temperature increases. In other words, the voltage value is decreased by the temperature increase. This means that a minimum peak (1) of the waveform in FIG. 6A is regarded as a point at which the temperature is the highest. Inside the liquid chamber 122, movement, phase change and the like occur in a short time, due to the thermal energy from the driving element 101. The liquid is boiled by the thermal energy and high pressure-bubbles are generated. At this moment, the fluid contacting the upper protective film 142 changes from liquid to gas. After the start of foaming, the volumes of the bubbles increase, but the pressure in the bubbles instantaneously drops and become negative pressure, hence it is inertial force that increases the volume of bubbles. After the volume of bubbles reach the maximum, the bubbles start to shrink, and the liquid attracted by the negative pressure reaches the protective film on the driving element 101. During this time, the liquid film around the bubbles may breakdown depending on the size of the liquid chamber 122 and the size of the bubbles, and the room temperature atmosphere may flow into the bubbles.

The waveform of the sensor 130 includes such complicated information on the phase state and the temperature change of the fluid inside the liquid chamber 122. When the fluid inside the liquid chamber moves and causes phase change, the temperature change is always generated by the substances having different thermal conductivities contacting each other. If it is determined whether or not this temperature change occurred based on the sensor waveform, the movement of the fluid can be detected. It is also essential to analyze the timing of the temperature change. For example, analyzing the timing from the foaming timing to the defoaming time makes it easier to estimate the movement of the fluid, and analyzing the timing and the duration of the change point in addition to the position of the sensor and the temperature change amount can estimate the movement of the fluid even more precisely. This means that the generation and state of the foreign substances can be accurately determined. On the other hand, in the case of sudden change, as in the instance when the fluid contacting the protective film changes from liquid to gas, the timing of the change point can be measured by the amount of temperature change, if a general timing based profile of the temperature is known. Hence inclusion of a circuit that directly analyzes the timings is not always required.

Figure 6B:
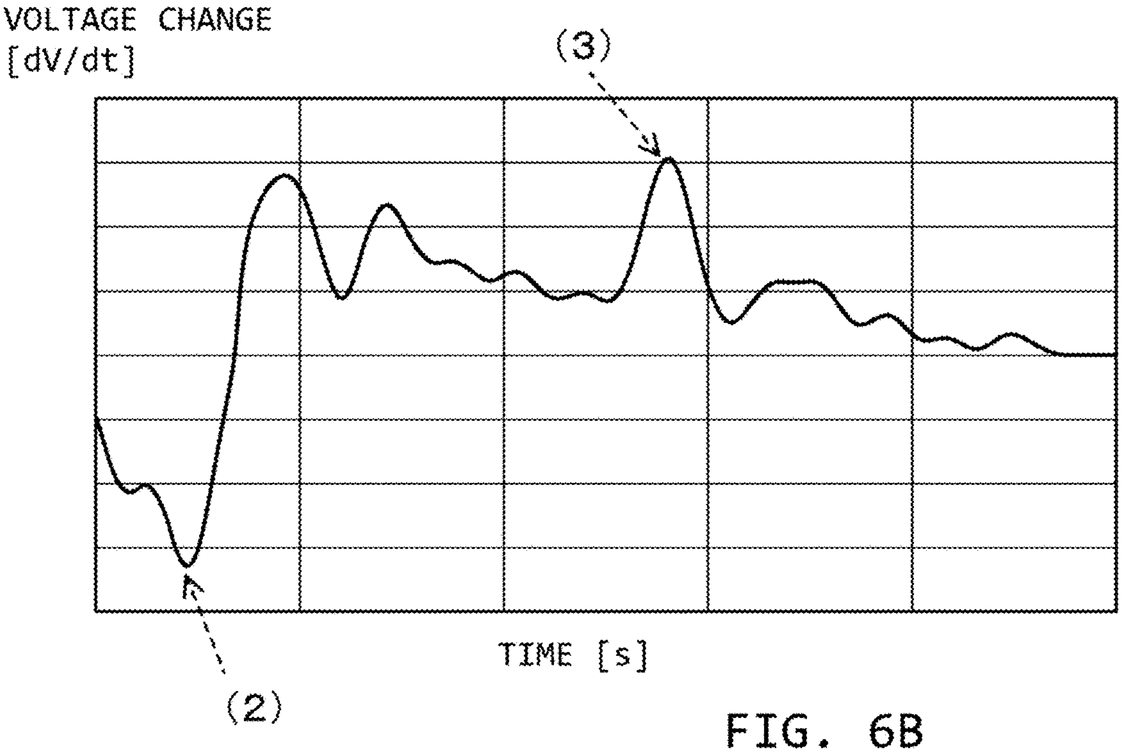

One effective means for detecting a change point as a signal on an electric circuit is to convert the change point of the temperature into a peak. FIG. 6B is a waveform processed such that the change point to be acquired becomes a peak. The abscissa indicates time [s], and the ordinate indicates the voltage change [dV/dt]. At the instant of foaming, the fluid contacting the protective film changes from liquid to gas, hence the heat emission from the circuit substrate 100 to the liquid is weakened. In FIG. 6A, there is a moment at which the decrease in voltage accelerates from the beginning of the waveform to the negative extreme value, and this change point is caused by foaming. FIG. 6B is a waveform generated from the waveform in FIG. 6A using a bandpass filter, so as to convert this change point into a peak. In FIG. 6B, point (2), which is the negative extreme value, can be obtained as the timing of foaming. In this example, a method of converting the change point into a peak using the bandpass filter was described, but such a method as differential processing or frequency analysis may be used if the change point can be emphasized and outputted.

Figure 7:
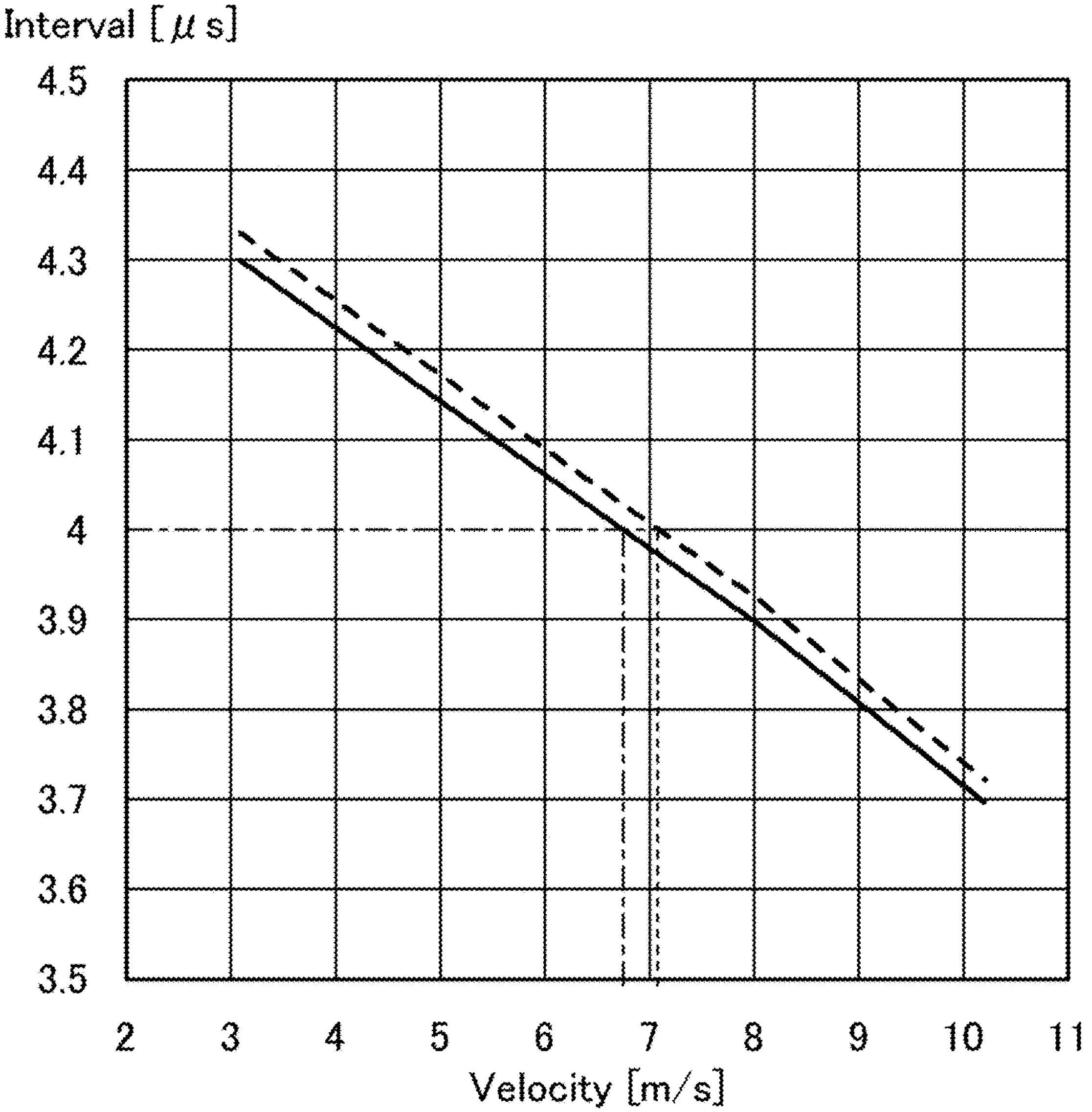
FIG. 7 is a graph indicating a signal outputted from a state classifying circuit according to Embodiment 1.

An example of this method for converting the time information of the waveform into ejection speed information of the droplets will be described. As the waveform conversion in FIG. 6B indicates, the foaming timing (first timing) indicated by (2) can be converted into the timing of the minimum value, and the timing when the liquid contacts the protective film on the driving element again (second timing) indicated by (3) can be converted into the timing of the maximum value respectively. Then by outputting the timings that indicated the maximum value and the minimum value, or the interval between these two timings from the circuit, the interval from the timing of foaming to the timing of contacting the liquid again can be calculated. In FIG. 6B, this interval time is indicated as the time from (1) to (2). This time and the ejection velocity of the droplets have correlation depending on the design of the nozzles and the liquid chamber, hence the characteristics indicated in FIG. 7 can be obtained. In FIG. 7, the abscissa indicates the velocity [m/s], and the ordinate indicates the interval [μs].

Therefore if characteristics unique to the nozzle/flow passage design, indicated in FIG. 7, are obtained in advance, and the interval acquired from the sensor waveform is collated, the velocity of the droplets can be obtained from the time information of the waveform. For example, the interval 4.0 us can be converted into the ejection velocity of 6.8 m/s. In some cases, the characteristics may have been shifted due to a temporary change, hence the ejection velocity range may be determined in conversion considering the shift in characteristics. In the case of FIG. 7, the original conversion coefficient is indicated by the solid line, and the conversion coefficient after a predetermined time has elapsed is indicated by the broken line. Therefore an estimated range of the ejection velocity when the interval time is 4.0 us is 6.8 to 7.1 m/s. In this example, the timing of foaming and the timing of contacting the liquid again are focused on, but other timings of the change point, influenced by the ejection velocity, are the timing of releasing the bubble pressure when communicating with the atmosphere, the timing of refilling the liquid in the flow passage direction, and the like. Conversion to the ejection velocity or ejection amount is also possible focusing on these timings.

Selection of Cleaning Means

An example of the method for selecting cleaning means based on the ejection velocity, which is one of the droplet characteristics, will be described. As indicated in FIG. 7, the cleaning means can be effectively selected by obtaining certain ejection velocity information of droplets and detecting the temporal changes. For example, if a minor drop in velocity is temporarily detected, it is highly possible that an insoluble substance, such as burnt deposit, is adhering to the protective film. In such a case, the ejection velocity can be effectively recovered by applying voltage to the protective film where the burnt deposit is adhering, and chemically eluting the burnt deposit.

In a case where a major drop and recovery of the ejection velocity are intermittently repeated, it is more likely that an appropriate filling and circulation of the liquid are interrupted by such a cause as clogging of a foreign substance in the flow passage. In such a case, the ejection velocity can be effectively recovered by pushing out the foreign substance in the flow passage direction using a liquid feeding pump, a filter, and the like, or by sucking the foreign substance in the liquid chamber out of the head using a vacuum pump or the like.

By detecting various change points and temporal changes thereof like this, the position and state of the foreign substances can be appropriately determined. The conversion processing described in Embodiment 1 is merely an example, and other methods may be used if the state of the foreign substance can be appropriately determined. For example, the position and state of the foreign substance may be determined by deep learning using a part of or all of the analog output waveforms in FIG. 6A as input data, and in this case, a dedicated processing circuit is integrated in the characteristic extracting unit 412, the state determining unit 413, the inference unit 422, and the like.

An example of outputting a classification example based on a number outputted from the state classifying unit 502 and a classification number linking with each nozzle of each row will be described with reference to FIGS. 8A and 8B. Here the ejection amount accuracy and the ejection angle can be calculated by applying the obtained waveform to a learned model, which indicates a relationship among the pre-created waveform, accuracy of the ejection amount, and the ejection angle. The ejection velocity and the ejection amount are obtained as values (scalars), and an index combining the ejection velocity and the ejection amount can be called the "ejection amount accuracy". Here the accuracy of the ejection velocity and the ejection amount are classified into 4 levels: "S", "A", "B" and "N. D. (abnormal)" in descending order. In other words, "S" is the case where both the ejection velocity and the ejection amount have no problems. "A" is the case where either one has changed, and "B" is the case when both have changed. Further, the size of the ejection angle (emission angle) is classified into 3 levels: small, medium and large. Then as indicated in FIG. 8A, a classification number is assigned to each position of the matrix. In the case where the accuracy is "N. D.", the classification number (9) is assigned regardless the election angle.

Classification using the waveform based on these classification numbers is determined for a part of or all of the nozzles, and the results are outputted as digital signals. FIG. 8B is a table indicating an example of the classification. Each of the plurality of nozzle rows (row 1, row 2) is assumed to include 500 nozzles 121 (1 to 500). In this table, in each nozzle 121, one of the above mentioned classification numbers, 0 to 9, is recorded. The apparatus main unit 503, recording the classification, executes the selection of an appropriate foreign substance removal means and the cleaning of the recording element unit 501, based on the distribution of the classification numbers and information on the temporal change.

In Embodiment 1, the classification numbers are set based on the droplet ejection state, but the present invention is not limited to this. For example, information outputted from the state classifying unit 502 may directly specify a type or conditions of the removal method. Further, information indicating the state and position of a foreign substance may be outputted, and in this case as well, an optimum removal method is considered by the inference unit 422.

Apparatus Configuration

Figure 9:
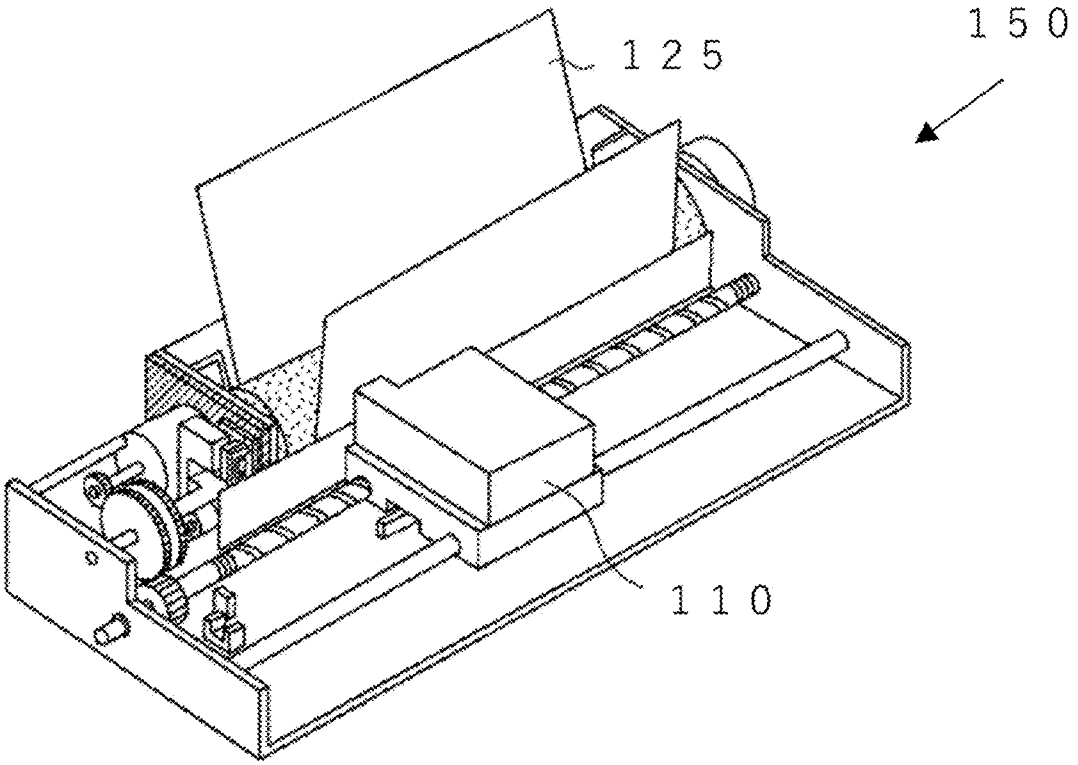
FIG. 9 is a schematic diagram of a liquid ejection apparatus to which a substrate of the present invention is applicable.
Figure 10:
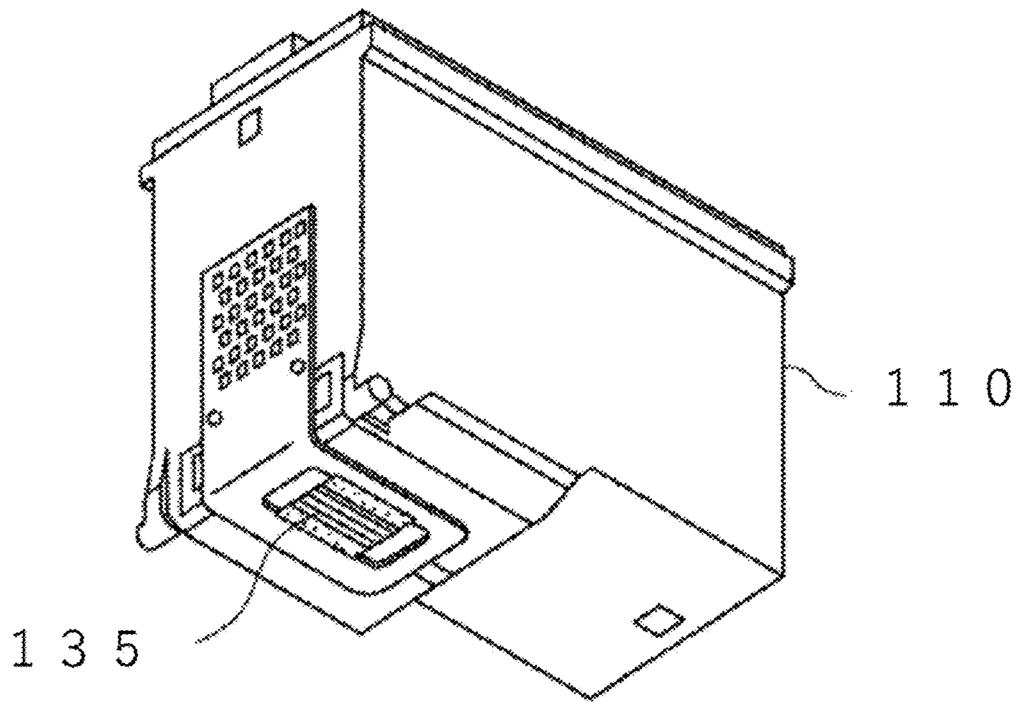
FIG. 10 is a schematic diagram of a liquid ejection head to which the substrate of the present invention is applicable.

FIGS. 9 and 10 are schematic diagrams depicting the configuration of major portions of an inkjet type liquid ejection apparatus (recording apparatus) to which the present invention is applicable. FIG. 9 is a general view of a liquid ejection apparatus 150 depicting a general configuration. FIG. 10 is a perspective view depicting a liquid ejection head 110, which is a composing element of the liquid ejection apparatus. The liquid ejection head 110 here records an image on a recording medium 125 by ejecting ink droplets from ejection ports corresponding to nozzles. The liquid ejection head 110 includes a recording element substrate 135, which includes a plurality of nozzle rows on which a plurality of nozzles are arrayed.

By applying the present invention to the liquid ejection head 110 and the liquid ejection apparatus 150, an optimum cleaning method can be selected, and the generation of an ejection failure can be reduced thereby. As a result, good image recording can be performed suppressing image failure.

As described above, according to the present invention, a liquid ejection apparatus, including a liquid ejection head (recording head), which can effectively maintain high print quality, can be provided. Thereby downtime, due to cleaning and replacement, can be decreased, and running cost can be minimized by maximizing the life of the liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-184713, filed on Oct. 27, 2023, which is hereby incorporated by reference herein in its entirety.

What is claimed is:

1. A liquid ejection apparatus comprising:

a liquid ejection head configured to eject liquid;

a plurality of removal units configured to remove foreign substances inside the liquid ejection head; and a control unit, wherein the liquid ejection head is formed by bonding a circuit substrate and a flow passage forming member, wherein a liquid chamber in which liquid is filled is disposed in a portion where the circuit substrate and the flow passage forming member are joined, wherein a liquid supply port to supply liquid to the liquid chamber is disposed on the circuit substrate, wherein nozzles to eject the liquid inside the liquid chamber are disposed in the flow passage forming member, wherein a plurality of driving elements configured to be heated by applying voltage and eject the liquid, and a plurality of temperature sensors are disposed on the circuit substrate, wherein the control unit is configured to select, from the plurality of removal units, a removal unit to remove the foreign substance, based on a result of analyzing a waveform of a signal outputted from a temperature sensor of the plurality of temperature sensors, wherein a protective film is disposed between the driving element and the liquid chamber on the circuit substrate, wherein the foreign substance is a burnt deposit adhering to the protective film, wherein the removal unit is unit for removing the burnt deposit by applying voltage to the protective film and eluting the protective film thereby, and wherein the control unit analyzes the waveform and determines a type of the foreign substance thereby, and selects the removal unit in accordance with the type of the foreign substance.

2. The liquid ejection apparatus according to claim 1, wherein the control unit determines a position of the foreign substance based on a waveform of each of the plurality of temperature sensors, and selects the removal unit in accordance with the position of the foreign substance.

3. The liquid ejection apparatus according to claim 1, wherein at least a part of the plurality of temperature sensors are disposed at positions overlapping with the liquid chamber in a plan view of the liquid ejection head.

4. The liquid ejection apparatus according to claim 1, wherein the protective film is a conductive film containing a platinum group element.

5. The liquid ejection apparatus according to claim 1, wherein the foreign substance is an adhering substance or a high viscosity liquid originating from the liquid.

6. The liquid ejection apparatus according to claim 5, wherein the foreign substance is a substance adhering to a surface on the opposite side of the liquid chamber of the flow passage forming member, and wherein the removal unit is a wiper configured to wipe out the surface on the opposite side.

7. The liquid ejection apparatus according to claim 5, wherein the removal unit is a unit for discharging the foreign substance by forcibly feeding and circulating the liquid in the liquid chamber.

8. The liquid ejection apparatus according to claim 5, wherein the removal unit is a unit for discharging the foreign substance by applying voltage to the driving element and foaming the liquid inside the liquid chamber thereby.

9. The liquid ejection apparatus according to claim 5, wherein the foreign substance is a substance adhering or remaining inside the nozzle.

10. The liquid ejection apparatus according to claim 9, wherein the removal unit is a unit for sucking the foreign substance from a surface on the opposite side of the liquid chamber of the flow passage forming member.

11. The liquid ejection apparatus according to claim 1, wherein the control unit determines a state of the foreign substance by analyzing a phase state and temperature change of the liquid inside the liquid chamber, based on the waveform of the signal outputted from the temperature sensor.

12. The liquid ejection apparatus according to claim 11, wherein the protective film is formed on the circuit substrate, between the driving element and the liquid chamber, and wherein the control unit calculates a first timing at which the liquid foamed due to heating of the driving element, and a second timing at which the liquid contacted the protective film again, based on the waveform of the signal, calculates an ejection velocity of the liquid based on the interval from the first timing to the second timing, and determines the state of the foreign substance thereby.

13. The liquid ejection apparatus according to claim 12, wherein in a case where the ejection velocity is temporarily decreasing, the control unit determines that the foreign substance is a burnt deposit adhering to the protective film.

14. The liquid ejection apparatus according to claim 12, wherein in a case where the ejection velocity repeats a drop and recovery, the control unit determines that the foreign substance is clogging the flow passage.

15. The liquid ejection apparatus according to claim 1, wherein the temperature sensor is formed of a material including at least one element of platinum, iridium, tungsten, zirconium, copper, nickel, zinc, titanium, silicon, and aluminum.

16. The liquid ejection apparatus according to claim 1, wherein the control unit determines the necessity of replacement of the liquid ejection head based on the waveform of the signal outputted from the temperature sensor.

* * * * *